Patented Nov. 21, 1944

2,363,034

UNITED STATES PATENT OFFICE 2,363,034

COMPOSITION OF MATTER

Gwynne Allen, Long Beach, Calif., assignor to Petrolite Corporation, Ltd., St. Louis, Mo., a corporation of Delaware No Drawing. Application May 27, 1942, Serial No. 444,763

9 Claims. (Cl. 260—402.5)

The object of this invention is to provide a new material or composition of matter which is particularly adapted for use as a demulsifier in the resolution of crude oil emulsions and as a break-inducer in the doctor treatment of gasoline, but which may have uses in other arts that I have not yet investigated.

This invention is a continuation in part of my copending application, Serial No. 392,099, filed on May 6, 1941. Reference is also made to my application Serial No. 444,761, which subsequently matured as U. S. Patent No. 2,326,599, dated August 10, 1943; Serial No. 444,762, which subsequently matured as U. S. Patent No. 2,329,025, dated September 7, 1943; application Serial No. 444,764, which subsequently matured as U. S. Patent No. 2,326,602, dated August 10, 1943; copending application Serial No. 444,765; and application Serial No. 444,766, which subsequently matured as U. S. Patent No. 2,329,026, dated September 7, 1943.

The new composition of matter that constitutes my present invention consists of or comprises an aminated polymeric sub-rubbery sulfur-converted ester of a polyhydric alcohol, and more particularly an ester in which there are present at least 2 acyl radicals derived from unsaturated high molal monocarboxylic detergent-forming acids having at least 8, and not more than 32, carbon atoms each.

It is known that when elemental sulfur is heated with a reactive detergent-forming carboxylic acid, for example with oleic acid, the sulfur adds at the double bond in the oleic acid chain or radical. Where the oleic acid is employed in combination with a polyhydric alcohol, such as glycerol, as for example in triolein which is the tri-glyceride of oleic acid, the reaction apparently does not stop with the formation of a simple addition product. Instead, as discussed in the literature, e. g., Knight and Stamberger, J. Chem. Soc. London, 1928, pp. 2791–8, triolein takes up additional sulfur atoms possibly even tied in through the glyceryl radical. Also, it is probable that the several fatty acid radicals present are also linked through sulfur atoms. Compare comparable reactions involving more reactive sulfur dichloride, and particularly the formation of cyclic bisulfides. Such reactions indicate the rationale for thioglycerol formation, or, more exactly, the formation of sulfurized esters of thioglycerol. See "Chemistry of Synthetic Resins," Ellis, 1935, volume 2, 1176–77. At any rate, in the course of the reaction polymers begin to be formed and a certain degree of elasticity becomes apparent. Molecular weight determinations show the presence of polymers, including diads and triads (dimers, trimers), etc. Destruction of the polymeric body, for example by saponification with alkali, results in a reduction of the molecular weight, loss of the elastic properties, and apparently a return to a simpler addition product. In preparing my material, I make no claim to the use of the simple unpolymerized addition product of sulfur and an unsaturated high molal monocarboxylic detergent-forming acid having at least 8, and not more than 32, carbon atoms typified by sulfurized oleic acid. I make no claim to the use of the free detergent-forming carboxylic acid and sulfur alone in preparing my reagent; but I employ the acid only in combination with a polyhydric alcohol compound containing two or more alcoholiform hydroxyl groups, in the form of an ester of such acid and such polyhydric alcohol.

The compound containing the two or more alcoholiform hydroxyl groups may be a simple polyhydric alcohol, such for example as glycerol or ethylene glycol; or it may be a condensed polyhydric alcohol like polyglycerol, di-ethylene glycol, di-glycerol, or tri-glycerol. In addition to the above polyhydric alcohols, I may also use mannitan, sorbitan, pentaerythritol, and di-pentaerythritol. I may use ether alcohols so long as they have two or more hydroxyl groups in the molecule, i. e. (polyhydric alcohols in which a carbon atom chain is interrupted at least once by oxygen, as exemplified by di-ethylene glycol previously mentioned). They are all characterized by containing two or more alcoholiform hydroxyl groups and by having the power to form esters with an unsaturated high molal monocarboxylic detergent-forming acid having at least 8, and not more than 32, carbon atoms.

Resinous and similar materials are sometimes classified as "thermoplastic," "thermo-setting," and "element-convertible." The expression "element-convertible" refers particularly to plastic coatings or drying oils in which hardening apparently is due to conversion into a new compound or composition by action of an element used, often oxygen. Thus, drying oils are often referred to as being "oxygen-convertible." For practical purposes, the only other element finding wide application for this purpose is sulfur. Hence, certain products, and particularly certain oils, are referred to as "sulfur-convertible," meaning that they react with sulfur or sulfur di-chloride to get polymeric materials, rubbery masses, factice, or the like.

The unsaturated high molal detergent-forming monocarboxylic acids employed by me in preparing my reagent are characterized by having a carbon atom chain, which I shall denote as "R," containing at least 8 carbon atoms and not more than 32 carbon atoms, and which must contain at least one unsaturated bond, i. e., at least one ethylene linkage. Such acids are sometimes referred to as "ethylenic."

The acyl radical may, of course, have present other non-functional groups, such as hydroxyl groups, acyl-oxy groups, etc. It is only necessary that the presence of such groups does not detract from (a) the detergent-forming ability of the acids, and (b) their susceptibility to sulfur conversion. Suitability of substituted acids is indicated by very simple tests. For instance, saponification with caustic potash, caustic soda, or the like, must yield a soap or soap-like material. Secondly, if the detergent-forming properties have not been eliminated by the presence of this substituent atom or radical, then it is only necessary to determine that susceptibility to sulfur conversion is still present. Such test is obviously the same procedure as is herein described for preparing my reagent, except that it is conducted on a small scale in the laboratory. If the substituted acid or ester which has been previously determined to have detergent-forming properties also shows sulfur conversion susceptibility, it is, of course, the obvious functional equivalent of the unsubstituted or unmodified acids or esters herein described and may be used with equal or even greater effectiveness.

Such high molal acids may be obtained from various sources, such as oils, fats, and waxes; or one may use petroleum acids, rosin acids, and the like. Petroleum acids include naturally-occurring naphthenic acids and also acids obtained by the oxidation of hydrocarbons and waxes. Rosin acids include abietic acid, pyroabietic acids, and the like. Saturated acids, such as saturated fatty acids, saturated naphthenic acids, saturated oxidized petroleum acids, etc., can frequently be converted into an unsaturated acid by halogenization, followed by a reaction of the kind exemplified by the internal Wurtz reaction.

My preference is to use unsaturated fatty acids, due to their low cost and ready availability. One need not use a single fatty acid, but may use the mixture obtained by saponification of a naturally-occurring oil or fat. For instance, special reference is made to the fatty acids, which occur naturally in olive oil, castor oil, peanut oil, cottonseed oil, fish oils, corn oil, soybean oil, linseed oil, sesame oil, lard oil, oleo oil, perilla oil, and many other naturally-occurring oils. Rapeseed oil, for example, contains appreciable proportions of tri-erucin, the tri-glyceride of erucic acid. I have found it useful to prepare my reagent.

As has been previously pointed out, the high molal acids are used in the form of the polyhydric alcohol ester having at least 2 such high molal acid radicals present. Since it is my preference to use the naturally-occurring fatty acids, it obviously follows that my preference is to use the naturally-occurring glycerides. However, if desired one can obtain the high molal acids from any source and esterify such acids with various polyhydric alcohols, such as the glycols, in the conventional manner to produce suitable esters, which may or may not have a free or unreacted alcoholiform hydroxyl group present. The fatty acid di-glycerides typify these esters which contain a free or unreacted alcoholiform hydroxyl group (in the residue of the polyhydric alcohol, glycerol). The fatty acid tri-glycerides do not possess this free alcoholiform hydroxyl. Both types of glyceride, for example, are suitable for my purpose, provided the fatty acid present satisfies the above-expressed requirements. The manufacture of such esters is so well known that no description is required in the present instance.

One may select esters of the mixed type and such mixed esters may even contain acyl radicals which either are not high molal in character or are not unsaturated, i. e., ethylenic in nature. For instance, diolein may be reacted with one mol of acetic acid or one mol of stearic acid to give an ester which would be satisfactory for the present purpose. As an example of a modified ester which may serve, reference is made to tri-acetylated triricinolein.

I have found that, in addition to naturally-occurring fatty acids, addition and substitution products of fatty acids—which latter modified fatty acids bear a simple genetic relationship to the parent fatty acids from which they were derived—are also useful for making my reagent, so long as they are in part unsaturated, i. e., possess some double bond, as shown by possession of an iodine number of appreciable magnitude.

Instead of employing natural poly esters of reactive detergent-forming carboxylic acids in preparing my reagent, I may use synthetic esters obtained by esterifying one or more reactive detergent-forming carboxylic acids with a polyhydric alcohol of the kind heretofore recited and described in a conventional esterification reaction, such as reacting the alcohol with the acid or acids in various molecular proportions in the presence of, for example, dry hydrogen chloride.

The compound produced by the interaction of a polyhydric alcohol of the above kind and a reactive detergent-forming carboxylic acid of the above kind will be termed a "poly ester" in the present description. In all instances, it must contain two or more radicals or residues derived from reactive detergent-forming carboxylic acids, which may be the same or different acids; and it contains one or more radicals or residues derived from polyhydric alcohols. Di-glycerides of unsaturated fatty acids are examples of poly esters, just as are the naturally-occurring tri-glycerides of unsaturated fatty acids.

The reaction of elemental sulfur with such a poly ester is at first one of simple addition of sulfur at the double bond in the chain "R" of an acid residue in such poly ester to form a sulfurized derivative which does not differ greatly from the parent ester in properties. However, when the reaction is allowed to proceed at controlled temperatures, there is obtained a complex polymeric sulfurized product of high molecular weight which is semi-elastic and highly viscous and which approaches the consistency of rubber, depending on the time and temperature of reaction and the proportions of reactants employed.

The nature of the chemical changes which take place is, to the best of my knowledge, not yet fully understood. I have referred above to a literature reference which suggests various mechanisms for the polymerization process. Without attempting to express exactly the composition of the reagents I employ, I desire to use those polymeric sulfurized bodies, obtained as above recited, which have a consistency short of rubber. Accordingly, I have termed them "sub-rubbery" to denote a range of polymerization between the simple sulfur addition products, on one hand, and the non-usable rubbers produced on superpolymerization, on the other. Such sub-rubbery products are capable of dissolving in solvents, such as benzol, etc., to produce fluid reagents which are practicable to be used commercially.

After preparing the polymeric sub-rubbery sulfurized derivative of a poly ester of a reactive detergent-forming carboxylic acid as above recited, I then aminate said derivative by means of an amino-body of the following kind.

The class of alkanolamines for my purpose is characterized by the presence in the molecule of one or more alkanol or substituted alkanol groups, i. e., groups like —CH₂OH, —C₂H₄OH, —C₃H₆OH, etc. They also contain one or more amino nitrogen atoms in the molecule. The commonest examples of the class are tri-ethanolamine, di-ethanolamine, and monoethanolamine, but the class also includes, for example, ethylethanolamine, dipropanolamine, tri-propanolamine, benzylethanolamine, cyclohexylpropanolamine, etc. In every case, the molecule of the alkanolamine contains one or more alkoxy or aralkoxy groups of the above kinds. One may also have amines of the same general type in which one or more simple alkanol groups are replaced by a related group containing an ether linkage. For example, the alkanol group in the ethanolamines is —C₂H₄OH. Amines containing, for example, the ether-linked group,

—C₂H₄OC₂H₄OH, are equally suited to my purpose. Similarly, the amino-bodies produced by an etherization reaction between a simple alkanolamine like an ethanolamine and a polyhydric alcohol like glycerol are suitable for my purpose, so long as they retain their basic nature.

The reagent which I claim as a new composition of matter may be prepared by reacting the polymeric sub-rubbery sulfurized ester of (a) a reactive detergent-forming carboxylic acid and (b) a polyhydric alcohol, with an alkanolamine of the above-described kind, to produce a complex condensation product.

In preparing my preferred reagent, 125 parts by weight of castor oil are heated to 180° C. Fifteen parts by weight of sulfur are added, and the mixture is stirred continuously for 45 to 60 minutes at 188 to 190° C., or until a sample withdrawn from the reaction vessel and cooled is semi-elastic and transparent, indicating the complete absence of unreacted sulfur. To this sulfurized body there is then added 20 parts by weight of tri-ethanolamine. The temperature is reduced somewhat by such addition, but is still sufficiently high to produce the desired reaction between the sulfurized castor oil body and the tri-ethanolamine.

As a second example of a reagent which I prefer to use, the following is given: 298 parts of ricinoleic acid are mixed with 46 parts by weight of glycerol, and the mixture is agitated and heated in the presence of dry hydrogen chloride gas at a temperature in excess of 100° C. for a period of time sufficient to produce an ester. (I have found that reacting 6 hours at 150° C. is satisfactory to accomplish this.) If this procedure is tedious or undesirable, the di-glyceride of ricinoleic acid may be prepared in any other desired manner. For example, di-glycerides are commonly prepared by treating two mols of the tri-glyceride with one mol of glycerol, in the presence of an alkaline catalyst. The ester so produced is mixed with 15% of its weight of elemental sulfur, and the agitation and heating are continued until all the sulfur is assimilated and a clear transparent product is obtained, as shown by a test on glass. The product has considerable viscosity and a semi-elastic nature. This product is then mixed with 53 parts by weight of diethanolamine at the same temperature, 150° C., and agitation is continued for a period of time until the reaction is complete. Usually, heating may be discontinued on addition of the diethanolamine, the reaction being completed by the time the temperature has dropped to atmospheric levels.

Other esters of unsaturated fatty acids or other reactive detergent-forming carboxylic acids of the kind heretofore mentioned may be used instead of the castor oil and the ricinoleic acid. For example, I have used cottonseed oil instead of castor oil in making certain examples of my reagent, and have found it to be useful therein. However, when cottonseed oil is used, the reaction is usually not as smooth as when castor oil is employed. Also, it is usually found that longer heating is required to produce the desired reagent of optimum properties. It is, therefore, preferable to use castor oil rather than cottonseed oil, so far as I am now aware. Also, other alkanolamines may be used instead of the tri-ethanolamine and di-ethanolamine of the above examples.

The stages of polymerization and condensation and the elastic properties of the resulting products may be altered by varying the temperature of the reaction, the time of the reaction, or the proportions of reactants employed, or any combination of these variables. I have found that the most effective reagents are those obtained by reacting 100 parts by weight of the ester with from 10 to 17 parts by weight of sulfur, controlling the temperature to avoid the evolution of hydrogen sulfide so far as is practicable and employing a time sufficient to obtain highly polymerized products which are, however, still soluble in petroleum distillates; and then aminating such sulfurized bodies with tri-ethanolamine using approximately 10 to 20 parts by weight of the amine.

While the foregoing description has shown products obtained by subjecting a sulfurized poly ester to the action of an amino-body, I have also found that the procedure may be modified in that the amination of the poly ester may take place first; and the aminated poly ester may be subsequently sulfurized to produce highly useful products. My invention, therefore, goes equally to the use of polymeric sub-rubbery derivatives produced by sulfurizing aminated poly esters of (a) reactive detergent-forming carboxylic acids and (b) polyhydric alcohols. The final products are broadly similar, but not necessarily of identical structural configuration when amination takes place before sulfurization and when amination takes place after sulfurization of the poly ester.

In other words, I have found that it is possible to prepare a reagent of broadly similar composition and of equally valuable properties by varying the above-recited method of preparation as follows: Instead of aminating a sulfurized poly ester of a detergent-forming carboxylic acid and a polyhydric alcohol, as above recited, I have reacted, for example, the same proportions of castor oil and tri-ethanolamine and have subsequently added the same proportion of sulfur with heat and stirring to produce my reagent. This alternative procedure usually offers no material advantages over that recited hereinbefore. In some instances, it appears to have a disadvantage in that black specks appear in the mixture in the course of manufacture (which, however, usually disappear on prolonged stirring under heat). I, therefore, prefer to employ the procedure recited above as to preferred reagents. However, my invention contemplates a reagent produced either by aminating a sulfurized poly ester of the above-described type or sulfurizing an aminated poly ester of the above-described type.

The products so produced are ordinarily somewhat basic in character. To the extent that basicity exists in the product, it may be used in its original form or it may be neutralized wholly or in part by reaction with a suitable acid. I have found, for example, that the acetates and the lactates prepared by reacting such basic examples of my product with acetic or lactic acid frequently have notable merit. My invention is intended to include the use of such salts, therefore.

The complex aminated polymeric sub-rubbery sulfurized compound obtained as recited above may be diluted with one or more solvents or diluents to improve its viscosity or other characteristics, as desired. Examples of suitable diluents are isopropanol, mineral spirits, benzol, etc.

In employing my reagent as a demulsifying agent, it is usually employed in the proportion of one part of reagent to from 2,000 to 20,000 parts of petroleum emulsion, either in concentrated form or after diluting as desired with a suitable vehicle or diluent or solvent. I desire to point out that the superiority of my reagent or demulsifying agent is based on its ability to treat or break certain emulsions more advantageously and at a lower cost than is possible with other available demulsifiers or conventional mixtures thereof.

In practising the process of demulsifying petroleum oil by means of my new reagent, it is brought into contact with or is caused to act upon the emulsion to be treated, in any of the various ways or by any of the various apparatus now generally used to resolve or break petroleum emulsions with a chemical reagent, the above procedure being used either alone or in combination with some other demulsifying procedure, such as the electrical dehydration process.

While I have described in detail the preferred embodiment of my invention, it is understood that the materials employed, the proportions of ingredients, the arrangements of steps, and the details of procedure may be variously modified without departing from the spirit of the subjoined claims.

I claim:

1. A composition of matter, consisting of an alkanolamine-reacted sub-rubbery polymeric sulfur-converted polyhydric alcohol ester; said ester prior to sulfur-conversion containing at least 2 unsaturated high molal detergent-forming monocarboxylic acid radicals having at least 8 carbon atoms and not more than 32 carbon atoms each; the reaction involving the alkanolamine being conducted with almost immediate completeness at a temperature of 150° C. to below 190° C., and ratios of reactants being as follows: For each 100 parts by weight of the high molal detergent-forming monocarboxy ester, there is employed 10 to 17 parts by weight of sulfur and 10 to 20 parts by weight of the alkanolamine.

2. A composition of matter, consisting of an alkanolamine-reacted sub-rubbery polymeric sulfur-converted polyhydric alcohol ester; said ester prior to sulfur-conversion containing at least 2 unsaturated high molal detergent-forming monocarboxylic acid radicals having at least 8 carbon atoms and not more than 32 carbon atoms each; and said ester prior to sulfur-conversion being free from any unreacted hydroxyl radical as part of the alcoholic residue; the reaction involving the alkanolamine being conducted with almost immediate completeness at a temperature of 150° C. to below 190° C., and ratios of reactants being as follows: For each 100 parts by weight of the high molal detergent-forming monocarboxy ester, there is employed 10 to 17 parts by weight of sulfur and 10 to 20 parts by weight of the alkanolamine.

3. A composition of matter, consisting of an alkanolamine-reacted sub-rubbery polymeric sulfur-converted polyhydric alcohol ester; said ester prior to sulfur-conversion containing at least 2 unsaturated fatty acid radicals having at least 8 carbon atoms and not more than 32 carbon atoms each; and said ester prior to sulfur-conversion being free from any unreacted hydroxyl radical as part of the alcoholic residue; the reaction involving the alkanolamine being conducted with almost immediate completeness at a temperature of 150° C. to below 190° C., and ratios of reactants being as follows: For each 100 parts by weight of the high molal detergent-forming monocarboxy ester, there is employed 10 to 17 parts by weight of sulfur and 10 to 20 parts by weight of the alkanolamine.

4. A composition of matter, consisting of an alkanolamine-reacted sub-rubbery polymeric sulfur-converted polyhydric alcohol ester; said ester prior to sulfur-conversion containing at least 2 monoethylenic fatty acid radicals having at least 8 carbon atoms and not more than 32 carbon atoms each; and said ester prior to sulfur-conversion being free from any unreacted hydroxyl radical as part of the alcoholic residue; the reaction involving the alkanolamine being conducted with almost immediate completeness at a temperature of 150° C. to below 190° C., and ratios of reactants being as follows: For each 100 parts by weight of the high molal detergent-forming monocarboxy ester, there is employed 10 to 17 parts by weight of sulfur and 10 to 20 parts by weight of the alkanolamine.

5. A composition of matter, consisting of an alkanolamine-reacted sub-rubbery polymeric sulfur-converted polyhydric alcohol ester; said ester prior to sulfur-conversion containing at least 2 radicals derived from monoethylenic fatty acids having 18 carbon atoms each; and said ester prior to sulfur-conversion being free from any unreacted hydroxyl radical as part of the alcoholic residue; the reaction involving the alkanolamine being conducted with almost immediate completeness at a temperature of 150° C. to below 190° C., and ratios of reactants being as follows: For each 100 parts by weight of the high molal detergent-forming monocarboxy ester, there is employed 10 to 17 parts by weight of sulfur and 10 to 20 parts by weight of the alkanolamine.

6. A composition of matter, consisting of an alkanolamine-reacted sub-rubbery polymeric sulfur-converted glycerol ester, said ester prior to sulfur-conversion containing 3 monoethylenic fatty acid radicals having 18 carbon atoms each; and said ester prior to sulfur-conversion being free from any unreacted hydroxyl radical as part of the alcoholic residue; the reaction involving the alkanolamine being conducted with almost immediate completeness at a temperature of 150° C. to below 190° C., and ratios of reactants being as follows: For each 100 parts by weight of the high molal detergent-forming monocarboxy ester, there is employed 10 to 17 parts by weight of sulfur and 10 to 20 parts by weight of the alkanolamine.

7. A composition of matter, consisting of an alkanolamine-reacted sub-rubbery polymeric sulfur-converted triricinolein; the reaction involving the alkanolamine being conducted with almost immediate completeness at a temperature of 150° C. to below 190° C., and ratios of reactants being as follows: For each 100 parts by weight of the high molal detergent-forming mono-carboxy ester, there is employed 10 to 17 parts by weight of sulfur and 10 to 20 parts by weight of the alkanolamine.

8. A composition of matter, consisting of a tri-ethanolamine - reacted sub - rubbery polymeric sulfur-converted polyhydric alcohol ester; said ester prior to sulfur-conversion containing at least 2 unsaturated high molal detergent-forming monocarboxylic acid radicals having at least 8 carbon atoms and not more than 32 carbon atoms each; the reaction involving the alkanolamine being conducted with almost immediate completeness at a temperature of 150° C. to below 190° C., and ratios of reactants being as follows: For each 100 parts by weight of the high molal detergent-forming monocarboxy ester, there is employed 10 to 17 parts by weight of sulfur and 10 to 20 parts by weight of the alkanolamine.

9. A composition of matter, consisting of a tri-ethanolamine-reacted sub-rubbery polymeric sulfur-converted tri-ricinolein; the reaction involving the alkanolamine being conducted with almost immediate completeness at a temperature of 150° C. to below 190° C., and ratios of reactants being as follows: For each 100 parts by weight of the high molal detergent-forming monocarboxy ester, there is employed 10 to 17 parts by weight of sulfur and 10 to 20 parts by weight of the alkanolamine.

GWYNNE ALLEN.